United States Patent
Gantman et al.

(10) Patent No.: US 9,143,337 B2
(45) Date of Patent: Sep. 22, 2015

(54) METHOD AND SYSTEM FOR PROVIDING ENHANCED BROADCAST ADVERTISING

(75) Inventors: Alexander Gantman, Poway, CA (US); Jack Steenstra, San Diego, CA (US); John Noerenberg, San Diego, CA (US); Randy Mouber, San Diego, CA (US); Jennifer Kentro, legal representative, Santee, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1132 days.

(21) Appl. No.: 11/685,160

(22) Filed: Mar. 12, 2007

(65) Prior Publication Data

US 2008/0227436 A1    Sep. 18, 2008

(51) Int. Cl.
| | |
|---|---|
| *H04L 12/18* | (2006.01) |
| *G06Q 30/02* | (2012.01) |
| *H04N 7/173* | (2011.01) |
| *H04N 21/41* | (2011.01) |
| *H04N 21/439* | (2011.01) |
| *H04N 21/44* | (2011.01) |
| *H04N 21/4784* | (2011.01) |
| *H04N 21/61* | (2011.01) |

(Continued)

(52) U.S. Cl.
CPC ............... *H04L 12/189* (2013.01); *G06Q 30/02* (2013.01); *H04N 7/17318* (2013.01); *H04N 21/4126* (2013.01); *H04N 21/4394* (2013.01); *H04N 21/44008* (2013.01); *H04N 21/4784* (2013.01); *H04N 21/6181* (2013.01); *H04N 21/6581* (2013.01); *H04N 21/812* (2013.01)

(58) Field of Classification Search
CPC ............ H04N 7/17318; H04N 21/812; H04N 21/6181; H04N 21/6581; H04N 21/4394; H04N 21/4784; H04N 21/44008; H04N 21/4126; H04L 12/189; G06Q 30/02
USPC ........ 455/403, 406, 408, 414.1, 414.2, 414.3, 455/415, 417, 445, 456.1, 457, 4, 66, 502, 455/550.1; 705/14, 14.19, 14.25, 17; 709/225
See application file for complete search history.

(56) References Cited

U.S. PATENT DOCUMENTS

| | | | | |
|---|---|---|---|---|
| 2001/0034651 A1* | 10/2001 | Marks et al. | ..................... | 705/14 |
| 2002/0044199 A1* | 4/2002 | Barzebar et al. | ........... | 348/14.01 |
| 2002/0044746 A1* | 4/2002 | Kronlund et al. | ............... | 385/53 |

(Continued)

FOREIGN PATENT DOCUMENTS

GB      2370946 A     7/2002

OTHER PUBLICATIONS

International Search Report and Written Opinion mailed Aug. 6, 2008 for PCT Application Serial No. PCT/US2008/056722, 12 pages.

*Primary Examiner* — Dinh P Nguyen
(74) *Attorney, Agent, or Firm* — Won Tae C. Kim

(57) ABSTRACT

One example provides a broadcast device configured to display an advertisement for viewing by a user and a mobile client device configured to capture information relating to the advertisement from the broadcast device. The mobile client device determines whether the captured information is sufficient to allow the mobile client device to generate an electronic coupon. If it is, the mobile client device generates a coupon may be stored in the mobile client device and subsequently presented at a point-of-sale device as part of a transaction. If the captured information is insufficient, the mobile client device may request additional information from an advertiser server either directly or via the broadcast device.

14 Claims, 5 Drawing Sheets

(51) Int. Cl.
*H04N 21/658* (2011.01)
*H04N 21/81* (2011.01)

(56) References Cited

U.S. PATENT DOCUMENTS

| | | |
|---|---|---|
| 2002/0056091 A1 | 5/2002 | Bala |
| 2002/0095333 A1* | 7/2002 | Jokinen et al. ............... 705/14 |
| 2002/0178060 A1* | 11/2002 | Sheehan ........................ 705/14 |
| 2003/0023482 A1* | 1/2003 | Messner et al. ............... 705/14 |
| 2003/0171096 A1* | 9/2003 | Ilan et al. .................... 455/3.06 |
| 2004/0117254 A1* | 6/2004 | Nemirofsky et al. .......... 705/14 |
| 2005/0239495 A1* | 10/2005 | Bayne ........................ 455/550.1 |
| 2006/0037039 A1 | 2/2006 | Aaltonen |
| 2006/0111967 A1* | 5/2006 | Forbes .......................... 705/14 |
| 2006/0149621 A1 | 7/2006 | Do et al. |
| 2008/0157993 A1* | 7/2008 | Du Breuil et al. ........... 340/825 |

* cited by examiner

METHOD AND SYSTEM FOR PROVIDING ENHANCED BROADCAST ADVERTISING

BACKGROUND

1. Field

Various examples pertain to advertising, and more specifically, to methods and systems for providing enhanced broadcast advertising content in a more instantaneous and targeted manner.

2. Background

Current advertising methods that utilize a broadcast medium, such as, a television or radio broadcast or a printed advertisement in a publication, are relatively passive or non-interactive in nature. Typically, in a television or radio broadcast, an advertisement or commercial would run and then contact information, such as a phone number or website, would be given so as to allow any interested person to contact the advertiser for further information.

Requiring someone to take the extra steps of calling a phone number or logging onto a website might discourage some people from further pursuit of the advertisement, especially in situations where some people may just have a slight initial interest or when the advertisement just offers marginal value. Even when someone is interested in an advertisement, s/he might not be able to make a phone call or log onto a website promptly upon seeing or listening to the advertisement and hence might subsequently forget to follow up.

Similarly, in a printed advertisement, in addition to providing contact information, the advertisement may also require a reader to physically remove a coupon and then present the coupon at the point of sale in order for the reader to qualify for or redeem any benefits. The imposition of such additional tasks may substantially reduce the effect of the advertisement. For example, a reader may not be able to physically remove a coupon due to a variety of reasons, such as, the reader not owning the publication or having the appropriate cutting tool available; also, a reader may easily misplace a coupon or otherwise forget to bring the coupon to the store.

Hence, it would be desirable to provide methods and systems for providing enhanced broadcast advertising in a more instantaneous manner.

SUMMARY

A method operational on a mobile client device is provided for enhanced advertising. Information related to an advertisement broadcasted by a local broadcast device is captured. A determination is made as to whether the captured information is sufficient to process an advertisement-related electronic coupon. If it is sufficient, an electronic coupon related to the advertisement is obtained based on the captured information. If the information is insufficient, then additional information associated with the advertisement is requested from an advertiser server via the broadcast device. The additional information is received from the advertiser server and the electronic coupon related to the advertisement is obtained based on the additional information received. The additional information received may include the electronic coupon. The additional information may be received by the mobile client device via the broadcast device or directly from the advertiser server. The request for additional information may be sent from the mobile client device to the broadcast device in a sonic signal. The electronic coupon may be presented at a point-of-sale device as part of a transaction. The electronic coupon may be stored on the mobile client device. The mobile client device may include a mobile phone and the broadcast device may include a television. The captured information related to the advertisement may be in video and/or audio form.

A mobile device is also provided comprising a module configured to capture information related to an advertisement broadcasted by a local broadcast device and a processor coupled to the module. The processor may be configured to (a) determine whether the captured information is sufficient to process an advertisement-related electronic coupon; and/or (b) obtain an electronic coupon related to the advertisement based on the captured information. The processor may be further configured to (c) request additional information associated with the advertisement from an advertiser server via the broadcast device; (d) receive the additional information from the advertiser server; and/or (e) obtain the electronic coupon related to the advertisement based on the additional information received. A user interface may enable a user to initiate capture of the advertisement related information.

A machine-readable medium is also provided having one or more instructions operational on a mobile client device for obtaining an electronic coupon from an advertisement. The one or more instructions may cause a processor to: (a) capture information related to an advertisement broadcasted by a local broadcast device; (b) determine whether the captured information is sufficient to process an advertisement-related electronic coupon; (c) (if the information is sufficient) obtain an electronic coupon related to the advertisement based on the captured information, (d) (if the information is insufficient) determine whether additional information is needed to obtain the electronic coupon; (e) request the additional information associated with the advertisement from an advertiser server via the broadcast device; (f) receive the additional information from the advertiser server; and/or obtain the electronic coupon related to the advertisement based on the additional information received.

Additionally, a method operational on a broadcast device is also provided for enhanced advertising. An advertisement from an advertiser server is received and presented to a user. A request for additional information may be received from a mobile client device associated with the user. The request for additional information is sent to the advertiser server. In response the additional information is received by the broadcast device from the advertiser server which sends it to the mobile client device.

The request for additional information may be received from the mobile client device as a sonic signal. The mobile client device may include a mobile phone and the broadcast device may include a television.

A broadcast device is also provided comprising: (a) a first communication interface coupled to a communication network; (b) a second communication interface for local communications with mobile client devices; and/or a processor coupled to the first communication interface and the second communication interface. The processor may be configured to (1) receive an advertisement from an advertiser server via the first communication interface, (2) present the advertisement to a user via a content delivery interface, (3) receive a request for additional information from a mobile client device associated with the user via the second communication interface, and/or (4) send the request for additional information to the advertiser server via the first communication interface. The processor may be further configured to (5) receive the additional information from the advertiser server; and/or (6) send the additional information to the mobile client device. The request for additional information is received from the mobile client device may be a sonic signal. The broadcast device may include a television and the mobile client device may include a mobile phone.

A machine-readable medium is also provided having one or more instructions operational on a broadcast device for providing enhanced advertising to a mobile client device. The one or more instructions may cause a processor to: (a) receive an advertisement from an advertiser server via the first communication interface, (b) present the advertisement to a user via a content delivery interface, (c) receive a request for additional information from a mobile client device associated with the user via the second communication interface, (d) send the request for additional information to the advertiser server via the first communication interface, (e) receive the additional information from the advertiser server, and/or (f) send the additional information to the mobile client device.

DETAILED DESCRIPTION

Figure 1:
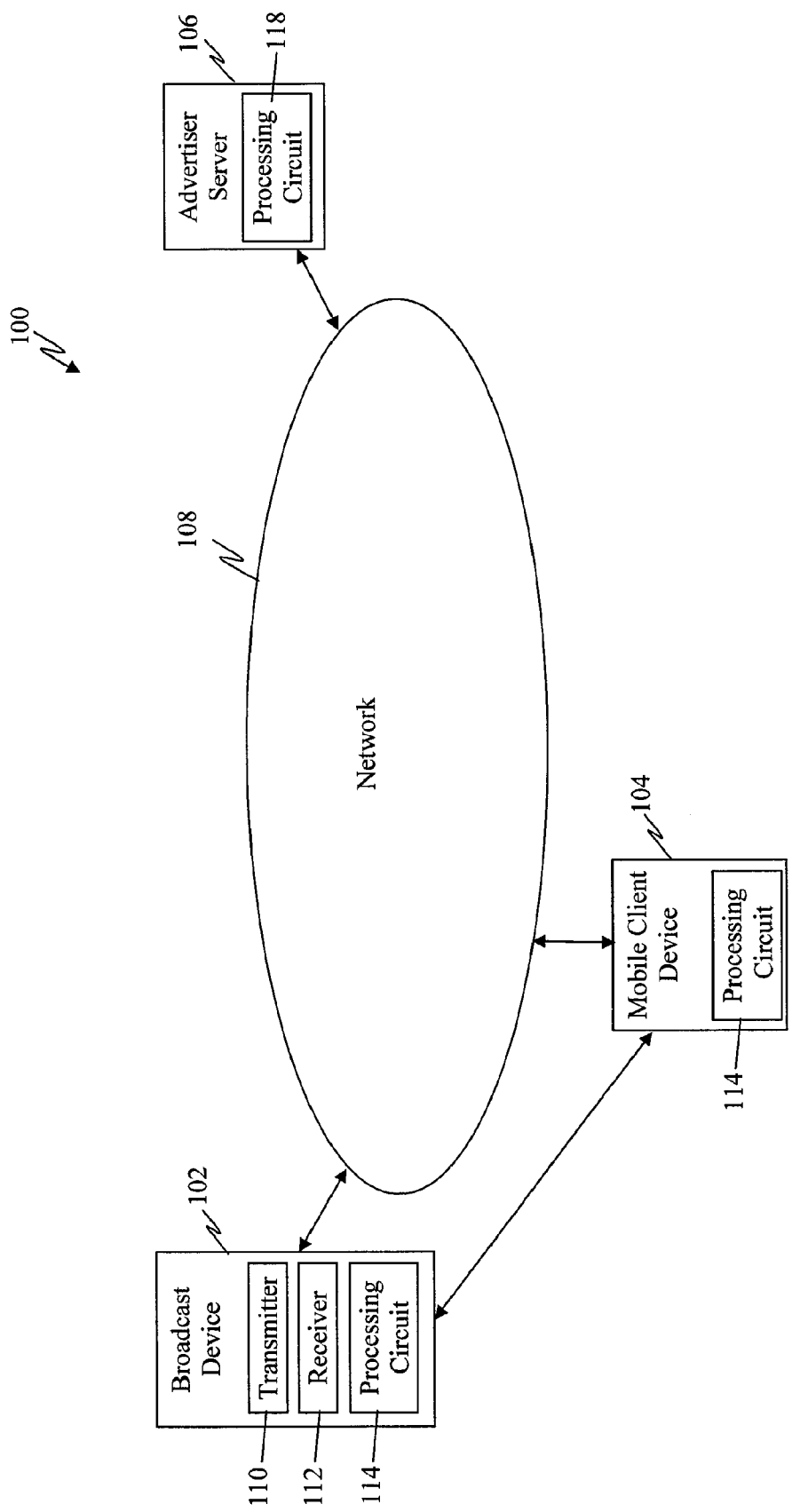
FIG. 1 illustrates a system 100 that may be used to provide enhanced advertising.

In the following description, specific details are given to provide a thorough understanding of the examples. However, it will be understood by one of ordinary skill in the art that the examples may be practiced without these specific details. For example, circuits may not be shown in block diagrams in order not to obscure the examples in unnecessary detail.

Also, it is noted that the examples may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, various configurations may be implemented by hardware, software, firmware, middleware, microcode, or a combination thereof. When implemented in software, firmware, middleware, or microcode, the program code or code segments to perform the described tasks may be stored in a machine-readable medium such as a storage medium or other storage means. A processor may perform the defined tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others. The methods disclosed herein may be implemented in hardware, software, or both.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One feature provides a method for enhanced advertisement distribution (e.g., coupons) to remote user mobile client devices. One configuration distributes advertisement-specific information through a local broadcast device (e.g., set top box, television set, etc.) to a user mobile client device (e.g., mobile phone, personal digital assistant, etc.). One feature provides for the user mobile client device to extract information from the advertisement-specific information and process it to generate an electronic coupon for later use at a point of sale. The term "electronic coupon" includes vouchers, discounts, product details, and/or any information that may be stored by a user mobile client device for use in a transaction. The user mobile client device may also be configured to obtain additional information (e.g., from the local broadcast device and/or a remote advertiser server) with which to initiate or process a transaction and/or generate an electronic coupon.

Another feature provides an advertiser server configured to deliver enhanced advertising content (e.g., coupons, vouchers, discounts, product details, etc.) either directly to a mobile client device or indirectly through the remote broadcast device.

FIG. 1 illustrates a system 100 that may be used to provide enhanced advertising. The system 100 may include a broadcast device 102, a mobile client device 104 and an advertiser server 106. The broadcast device 102, the client and the advertiser server 106 may be interconnected by a network 108. The network 108 may include a computer network, such as, the Internet, or other types of communications networks. The network 108 may comprise two or more sub-networks that independently or cooperatively facilitate communications amongst the broadcast device 102, the advertiser server 106 and/or the mobile client device 104. For example, the mobile client device 104 may communicate with the advertiser server 106 via a first network and the broadcast device 102 may communicate with the advertiser server 106 via a second network. The broadcast device 102, the mobile client device 104 and the advertiser 106 may further include corresponding processing circuits 114, 116 and 118 configured to carry out their respective functionality, as will be further described below.

The broadcast device 102 may include a transmitter 110 and/or a receiver 112 for transmitting and receiving audio, video, data, and/or control signals, respectively. The broadcast device 102 may be configured to provide advertisement information to a user and may also be able to receive signals from the user. Illustrative examples of the broadcast device 102 may include a television, a radio, a set-top box, or other types of communications devices that are capable of transmitting and/or receiving signals.

The mobile client device 104 may be used by the user to communicate locally with the broadcast device 102 in response to the advertisement information provided to the user. Illustrative examples of the mobile client device 104 may include, but are not limited to, a mobile phone, a personal digital assistant (PDA), a computer, a handheld device or other types of communication devices that are capable of communicating with the broadcast device 102. The mobile client device 104 and the broadcast device 102 may communicate with each other in a number of ways. For example, the mobile client device 104 and the broadcast device 102 may be enabled to handle point-to-point wireless communication technologies, such as, Ultra-Wide Band, Bluetooth, infrared or other wireless communication technologies.

Figure 2:
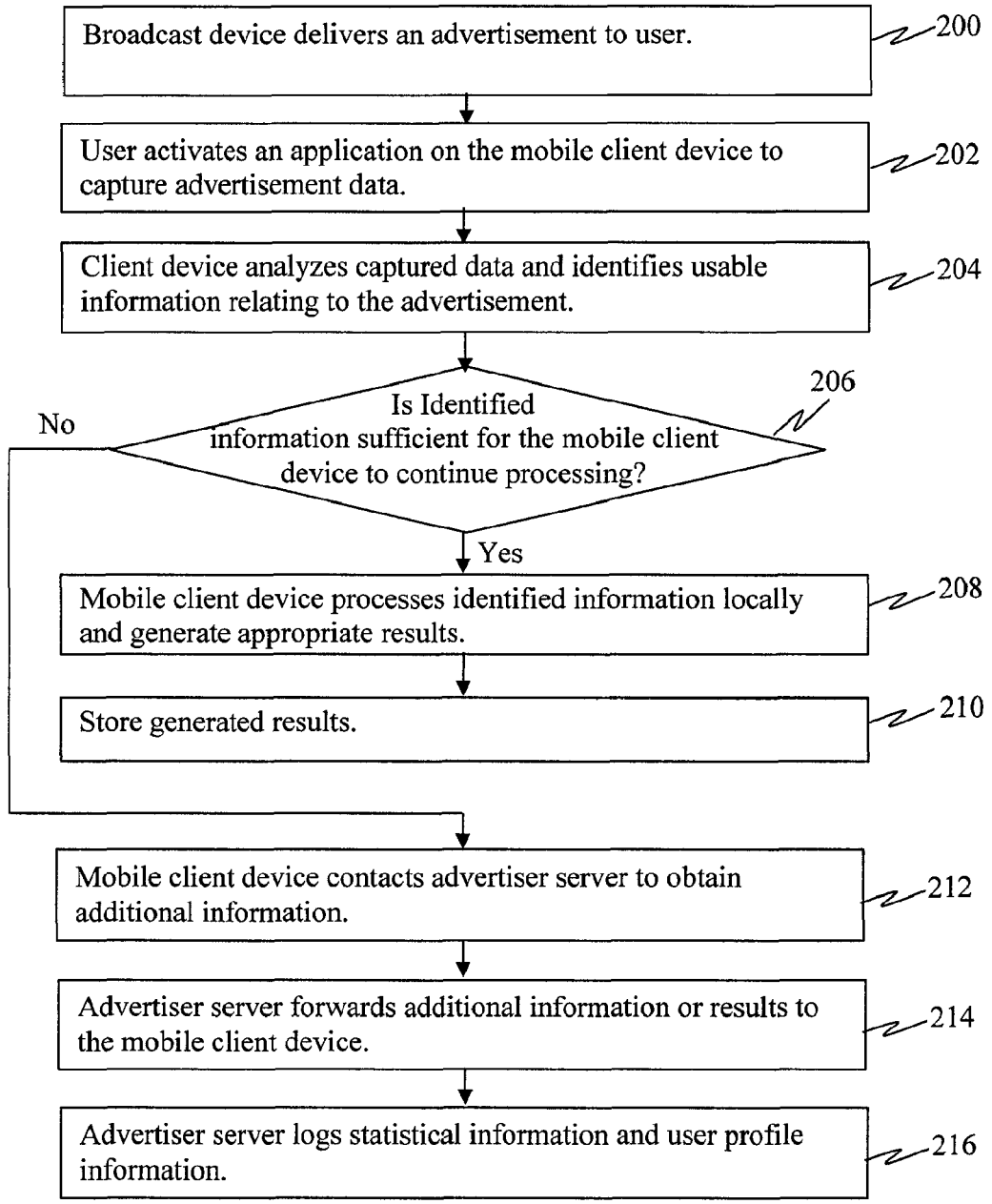
FIG. 2 illustrates a method operational to provide enhanced advertisement information to a user mobile client device.

FIG. 2 illustrates a method operational to provide enhanced advertisement information to a user mobile client device. In this example, the broadcast device 102 (FIG. 1) may be a television set or set-top box and the mobile client device 104 (FIG. 1) may be a mobile phone. The broadcast device delivers an advertisement to a user 200. The advertisement may be delivered using audio/visual data. In another example, the broadcast device may be a radio that delivers the advertisement using radio waves. As part of the advertisement, certain advertisement data including, for example, product ID, is displayed to the user. Upon seeing the advertisement, the user activates an application on the mobile client device to capture (some or all) advertisement data 202. The advertisement data may be captured in a number of ways. For example, if the advertisement data is displayed visually, the mobile client device may capture the video data using a video module or camera. If the advertisement data is delivered in audio form, the mobile client device may capture the audio data using an audio module or microphone. If the advertisement data includes audio/video data, the mobile client device may capture such data using both video and audio modules.

The mobile client device then analyzes the captured data to identify relevant information relating to the advertisement 204. Such relevant information includes, for example, information identifying the advertisement. The captured data may be analyzed in a number of ways. For example, if the captured data is video data, a pattern recognition application may be used to identify usable information from the video data. Alternatively, if the captured data is audio data, a demodulation application may be used to identify the usable information from the audio data.

The mobile client device then determines whether the identified information sufficient to continue processing 206 or additional information or assistance is needed for further processing.

If it is determined that the identified information alone is sufficient for the mobile client device to continue processing, the mobile client device continues to process the identified information locally and generates appropriate results 208. In this matter, enhanced advertising content (e.g., coupons, etc.) may be targeted to interested users. For example, if the advertisement offers a discount or coupon for a particular product or service, the mobile client device generates an electronic version of the coupon for the user. The coupon may have certain restrictions, such as an expiration date or geographical location limitations.

The mobile client device may store the generated results for future retrieval by the user 210. For example, the user may subsequently retrieve a stored coupon from the mobile client device (e.g., mobile phone) and transfer it over to another device (not shown) at the point of sale for verification. That is, the mobile client device may electronically store one or more coupons (e.g., vouchers, discounts, etc.) that can later be presented at a point of sale or register (e.g., over a local wireless link), and/or over a network (e.g., for a transaction being conducted over remotely).

On the other hand, if it is determined that additional information or assistance is needed for further processing, the mobile client device may then contact the advertiser server to obtain the additional information 212. The mobile client device may forward some or all of the identified advertisement information as well as other information, such as user and device information, to the advertiser server. In response, the advertiser server may provide additional information to the mobile client device thereby allowing the mobile client device to continue processing. Alternatively, the advertiser server may invoke the appropriate processing unit and perform the processing itself. The advertiser server may then forward the results to the client device 214. Similarly, the mobile client device may then store the results received from the advertiser server for future retrieval by the user. For example, the advertiser server may forward additional information to the mobile client device to allow it to generate a coupon pertaining to a product and/or service featured in the advertisement. Alternatively, the advertiser server may generate the coupon and then forward it to the mobile client device.

The advertiser server may also log and collect relevant information relating to the advertisement and the user for future reporting and statistical purposes 216. For example, the advertiser server may collect statistical information relating to a particular advertisement to determine the effectiveness of that advertisement. Similarly, the advertiser server may also collect statistical information relating to a particular user to determine the purchase or viewing behavior of that user with respect to advertisements. Collected information may then be provided to advertisers to allow them to better tailor their advertisements for specific users.

Figure 3:
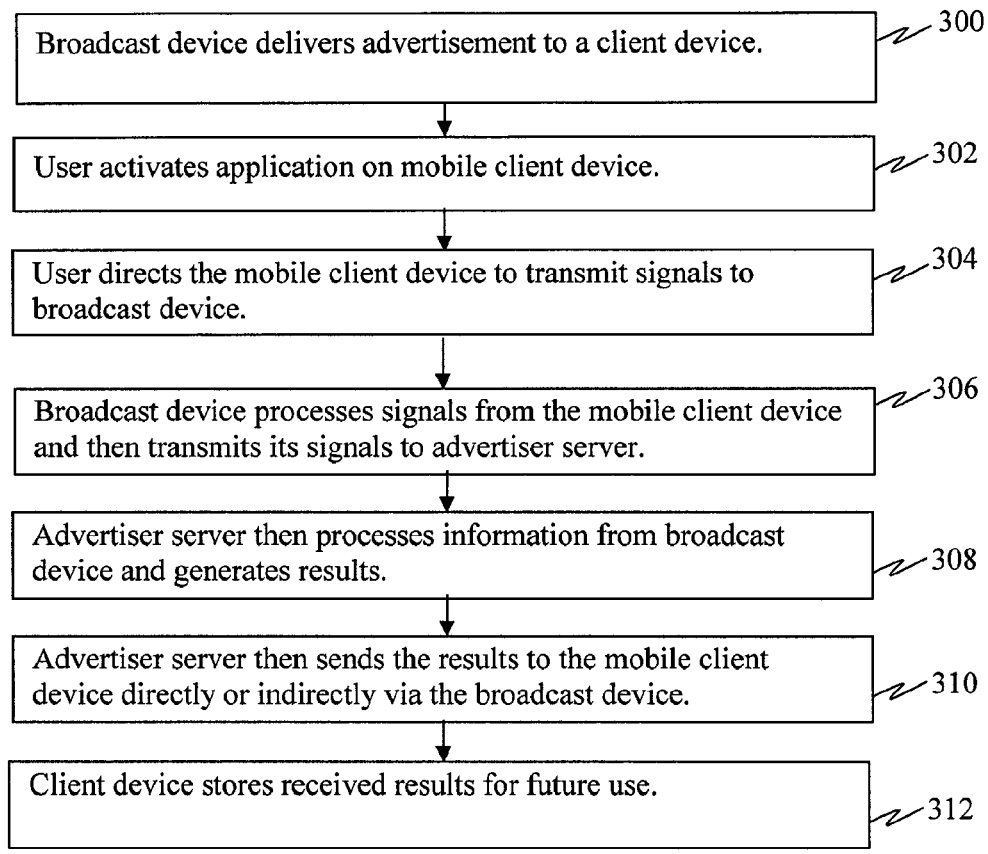
FIG. 3 illustrates an alternative method operational to provide enhanced advertisement information to a user mobile client device.

FIG. 3 illustrates an alternative method operational to provide enhanced advertisement information to a user mobile client device. In this example, the broadcast device may be a television and the mobile client device may be a mobile phone. The broadcast device delivers an advertisement to a client device 300. The advertisement may be delivered using audio/visual data.

Upon receiving the advertisement, the user may activate an application residing on the mobile client device 302. The application may be configured to transmit a signal from the mobile client device to the broadcast device. The signal may represent a request by the user to seek further information relating to the advertisement. The signal from the mobile client device to the broadcast device may be a local or close range sonic, wireless, or infrared signal, for example. For instance, if the user is interested in the advertisement, the user may direct the mobile client device to transmit a sonic signal to the broadcast device within a prescribed time period as may be described by the advertisement. The broadcast device may be configured to detect and capture the sonic signal. The sonic signal may include information that identifies the user and/or the mobile client device.

The broadcast device captures the sonic signal via a receiver. The broadcast device demodulates the sonic signal and derives the relevant information relating to the user and the mobile client device. The broadcast device then modulates signals based on the relevant information relating to the user, the mobile client device and the advertisement and transmits the signals to an advertiser server 306.

The advertiser server processes the information received from the broadcast device and generates appropriate results with respect to the advertisement 308. The advertiser server then sends the results to the mobile client device directly or indirectly via the broadcast device 310. Similarly, the mobile client device may then store the results for future use 312. For example, the advertiser server may generate a coupon relating to the advertisement viewed by the user and forward the coupon to the client device. The transfer of information between the advertiser server and the mobile client device may be achieved in a number of ways. For example, electronic mail service and/or Short Message Service (SMS) may be used.

Figure 4:
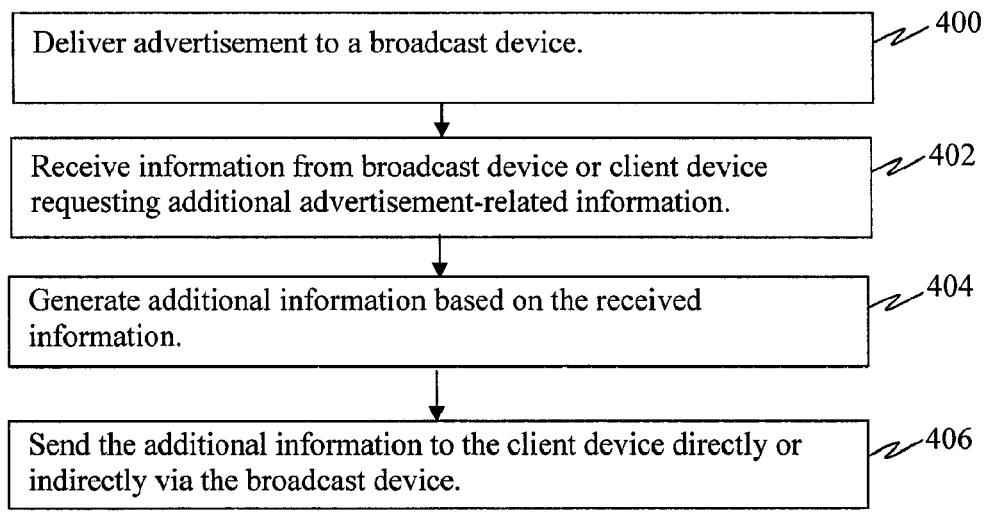
FIG. 4 illustrates a method operational on an advertiser server to provide enhanced advertising to user client devices.

FIG. 4 illustrates a method operational on an advertiser server to provide enhanced advertising to user client devices. The advertiser server delivers advertisement to a broadcast device 400. Such advertisement may be for a product or service, for example. The broadcast device may be a television set or a radio device, for example, and the advertisement may be delivered in audio and/or video form.

The advertiser server may receive information from broadcast device or (mobile) client device requesting additional advertisement-related information 402. That is, the broadcast device (e.g., set top box, etc.) may have the capabilities to both receive from and transmit to the advertiser server. The client device (e.g., mobile phone) may also be capable of transmitting information to the advertiser server directly, or indirectly via the broadcast device. Upon receiving such request, the advertiser server generates additional information based on the received information 404. For example, it may generate a coupon, discount, voucher and/or credit for the requesting user client device. Alternatively, it may generate information which can be used by the (mobile) client device to generate its own coupon, discount, voucher and/or credit. The additional information is then sent to the (mobile) client device directly or indirectly via the broadcast device 406.

Figure 5:
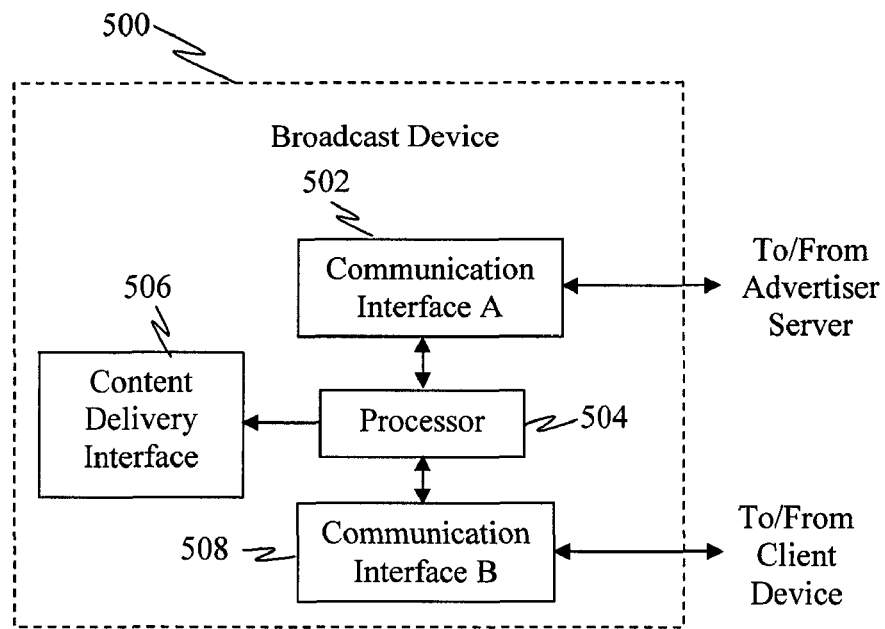
FIG. 5 illustrates one example of a broadcast device configured to facilitate enhanced advertising to user client devices.

FIG. 5 illustrates one example of a broadcast device 500 configured to facilitate enhanced advertising to user client devices. The broadcast device 500 may include a first communication interface 502 to communicate with an advertiser server, over a wired or wireless network. For example, the broadcast device 500 may receive advertisements from the advertiser server over the first communication interface 502. A processor 504 receives the advertisements and displays them through a content delivery interface 506 that may be a display screen or audio speaker, for example. A second communication interface 508 may be coupled to the processor 504 and used to communicate to and/or from a (mobile) client device.

Consequently, a broadcast device is provided comprising: (a) means for receiving an advertisement from an advertiser server (e.g., communication interface A 502); (b) means for presenting the advertisement to a user (e.g., content delivery interface 506); (c) means for receiving a request for additional information from a mobile client device associated with the user (e.g., communication interface B 508); (d) means for sending the request for additional information to the advertiser server (e.g., communication interface A 502); (e) means for receiving the additional information from the advertiser server (e.g., communication interface A 502); and/or (f) means for sending the additional information to the mobile client device (e.g., communication interface B 508).

Figure 6:
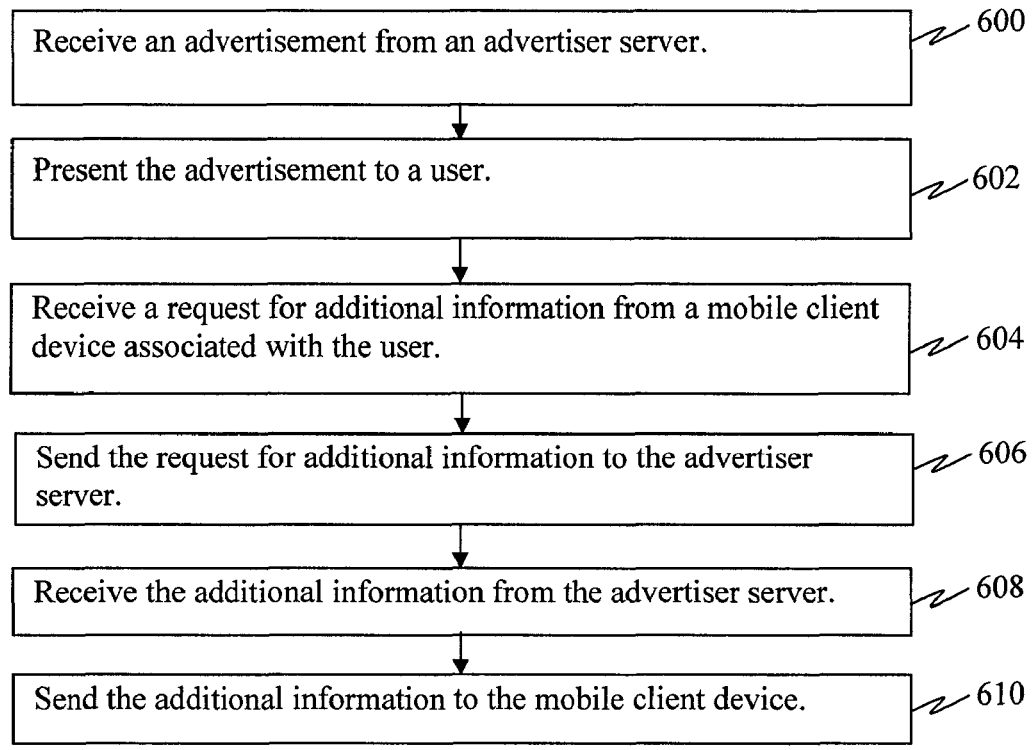
FIG. 6 illustrates a method operational on a broadcast device to facilitate delivery of enhanced advertisements to user mobile client devices.

FIG. 6 illustrates a method operational on a broadcast device to facilitate delivery of enhanced advertisements to user (mobile) client devices. The broadcast device receives an advertisement from an advertiser server 600. The broadcast device presents the advertisement to a user 602. For example, it may display a video and/or play audio advertising content. The broadcast device may receive a request for additional information from a (mobile) client device associated with the user 604. The broadcast device then sends the request for additional information to the advertiser server 606. In response, the broadcast device may receive the additional information from the advertiser server 608 and send it to the (mobile) client device 610.

Figure 7:
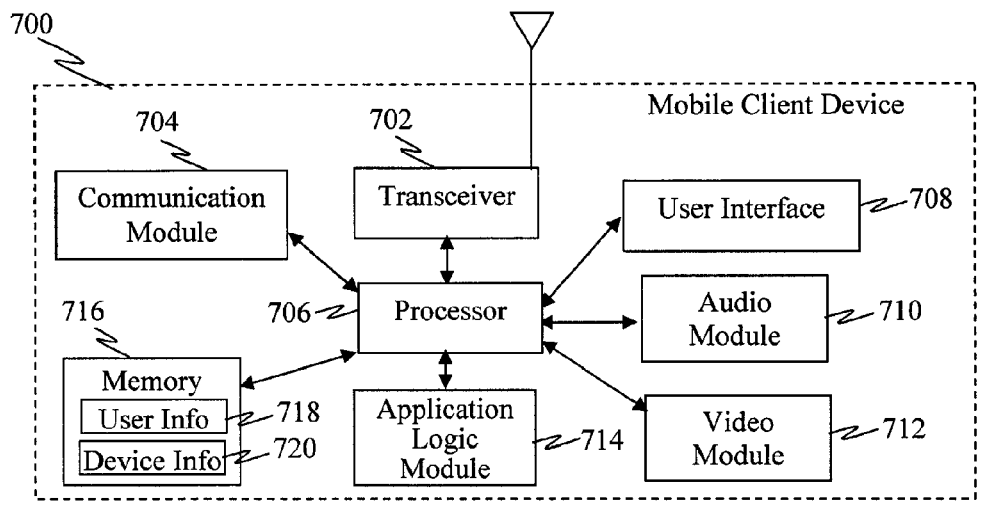
FIG. 7 illustrates one example of a mobile client device configured to receive and/or process enhanced advertising.

FIG. 7 illustrates one example of a mobile client device configured to receive and/or process enhanced advertising. The mobile client device 700 may include a transceiver 802, a communication module 704, a user interface 808, an audio module 710, a video module 812, an application logic module 714, a memory 716, and a processor 706.

The transceiver 702 may be configured to transmit and receive signals to and from the mobile client device 700. The transceiver 702 and the communication module 704 may cooperate collectively to facilitate wireless communications with a base station (not shown) which may be part of the network 108 (FIG. 1). The transceiver 702 and the communication module 704 may provide various signals processing functions such as encoding and modulation. In the case of a Code Division Multiple Access (CDMA) client device, the communication module 704 may be configured to perform spread spectrum processing.

The user interface 708 may include, for example, a screen, a key pad or other input/output devices that allow a user of the mobile client device 700 to view certain information and provide input to the mobile client device 700.

The audio module 710 may include, for example, a microphone or other types of audio devices that are configured to capture and/or output audio data. It should be noted that the audio module 710 may be equipped to handle audio data in a variety of sonic frequencies, some of which may not be humanly perceptible.

The video module 712 may include, for example, a camera or other types of video devices that are configured to capture video data and/or images.

The application logic module 714 may include various types of processing unit that are configured to support corresponding applications. Such applications may include, for example, a pattern recognition application and an advertisement data capture and generation application.

The memory 716 may be used to store various types of information including, for example, user information 718 and device information 718. Device information 718 may further include device ID, timestamp and location information.

The processor 706 may be configured to control operations of the mobile client device 700 by providing coordination among the various components mentioned above.

Consequently, a mobile device is provided comprising: (a) means for capturing information related to an advertisement broadcasted by a local broadcast device (e.g., audio module 710 and/or video module 712), (b) means for determining whether the captured information is sufficient to process an advertisement-related electronic coupon (e.g., processor 706 and/or application logic module 714); (c) means for obtaining an electronic coupon related to the advertisement based on the captured information (e.g., processor 706); (d) means for requesting additional information associated with the advertisement from an advertiser server via the broadcast device (communication module 704 and/or transceiver 702); (e) means for receiving the additional information from the advertiser server (communication module 704 and/or transceiver 702); and/or (f) means for obtaining the electronic coupon related to the advertisement based on the additional information received (e.g., processor 706).

Figure 8:
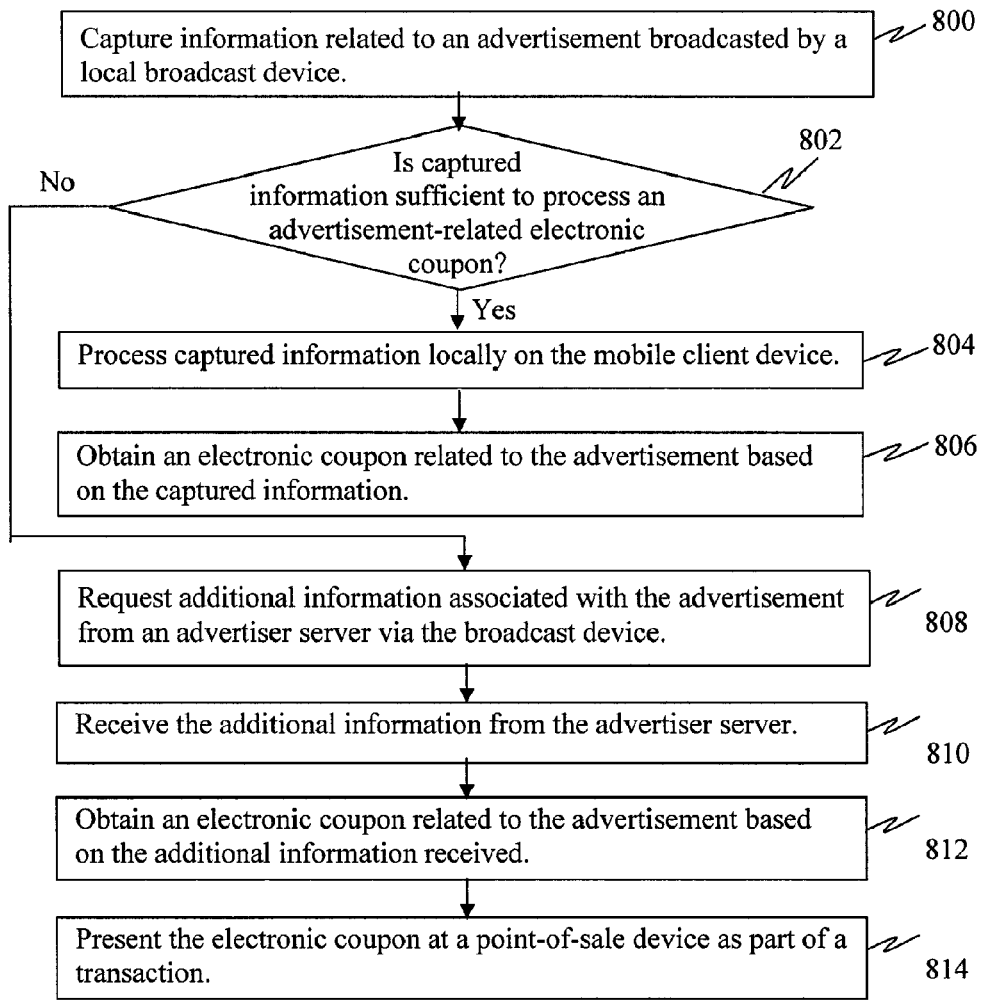
FIG. 8 illustrates a method operational on a mobile client device configured to receive and/or process enhanced advertising.

FIG. 8 illustrates a method operational on a mobile client device configured to receive and/or process enhanced advertising. The mobile client device captures information related to an advertisement broadcasted by a local broadcast device 800. For instance, the mobile client device may capture a whole image, part of an image, and/or audio clips from the advertisement. This may be used to identify the advertisement by an advertiser server, for example. A determination is made as to whether the captured information is sufficient to process an advertisement-related electronic coupon 802. This may involve determining whether the captured information is sufficient for the mobile client device to generate a coupon, voucher, discount, etc., associated with the advertisement. If the captured information is sufficient, the mobile client device processes the captured information locally 804 and obtains or generates an electronic coupon related to the advertisement based on the captured information 806. The mobile client device may request additional information associated with the advertisement from an advertiser server via the broadcast device 808. In response, the mobile client device may receive the additional information from the advertiser server 810 and processes the additional information to obtain an electronic coupon related to the advertisement 812. The mobile client device may present the electronic coupon at a point-of-sale device as part of a transaction 814.

The system as described above according to the present disclosure can be deployed in various applications. For example, the system can be deployed for use in connection with television infomercial programs and shopping channels. A viewer may use his/her mobile phone to request additional information on a product or service that s/he just saw on television. Based on the disclosure and teachings provided herein, a person of ordinary skill in the art will appreciate how to deploy the system in other applications.

One or more of the components, steps, and/or functions illustrated in FIGS. 1-8 may be rearranged and/or combined into a single component, step, or function or device in several components, steps, or functions without departing from the invention. Additional elements, components, steps, and/or functions may also be added without departing from the invention. The apparatus, devices, and/or components illustrated in FIGS. 1, 5 and/or 7 may be configured to perform one or more of the methods, features, or steps described in FIGS. 2, 3, 4, 6, and/or 8.

Those of skill would further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

It should be noted that the foregoing configurations are merely examples and are not to be construed as limiting the invention. The description of these examples is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a mobile client device comprising:
    capturing information related to an advertisement broadcasted by at least one of a television or a set top box associated with the television;
    determining by the mobile client device whether the captured information is sufficient to process an advertisement-related electronic coupon;
    determining by the mobile client device whether additional information from outside the mobile device is to be requested based on the determination of whether the captured information is sufficient to process the advertisement-related electronic coupon;
    in response to a determination that the captured information is insufficient to process the advertisement-related electronic coupon, requesting additional information associated with the advertisement from an advertiser server via the at least one of the television or the set top box associated with the television, receiving the additional information from the advertiser server, and obtaining the electronic coupon related to the advertisement based at least on the additional information received, wherein the additional information is received by the mobile client device via the at least one of the television or the set top box associated with the television in a sonic signal; and
    in response to a determination that the captured information is sufficient to process the advertisement-related electronic coupon, obtaining an electronic coupon related to the advertisement based only on the captured information and information from within the mobile client device so that the electronic coupon is stored on the mobile client device.

2. The method of claim 1, wherein the additional information received includes the electronic coupon.

3. The method of claim 1, further comprising:
    presenting the electronic coupon at a point-of-sale device as part of a transaction.

4. The method of claim 1, wherein the mobile client device includes a mobile phone.

5. The method of claim 1, wherein the information is audio data broadcasted via a sonic signal.

6. The method of claim 1, wherein the information is video data broadcasted by displaying the video data, capturing the video data broadcasted by displaying the video data using at least one of a camera or video module.

7. The method of claim 5, capturing the audio data broadcasted via the sonic signal using at least one of a microphone or audio module.

8. A mobile device comprising:
means for capturing information related to an advertisement broadcasted by at least one of a television or a set top box associated with the television;
means for determining whether the captured information is sufficient to process an advertisement-related electronic coupon;
means for determining whether additional information from outside the mobile device is to be requested based on the determination of whether the captured information is sufficient to process the advertisement-related electronic coupon;
means for, in response to a determination that the captured information is insufficient to process the advertisement-related electronic coupon, requesting additional information associated with the advertisement from an advertiser server via the at least one of the television or the set top box associated with the television, receiving the additional information from the advertiser server, and obtaining the electronic coupon related to the advertisement based at least on the additional information received, wherein the additional information is received by the mobile device via the at least one of the television or the set top box associated with the television in a sonic signal; and
means for, in response to a determination that the captured information is sufficient to process the advertisement-related electronic coupon, obtaining an electronic coupon related to the advertisement based only on the captured information and information from within the mobile device so that the electronic coupon is stored on the mobile device.

9. The mobile device of claim 8, further comprising:
means for presenting the electronic coupon at a point-of-sale device as part of a transaction.

10. The mobile device of claim 8,
wherein the information is audio data broadcasted via a sonic signal; and
the means for capturing information capturing the audio data broadcasted via the sonic signal.

11. A mobile device comprising:
a module configured to capture information related to an advertisement broadcasted by at least one of a television or a set top box associated with the television;
a processor coupled to the module, the processor configured to:
determine whether the captured information is sufficient to process an advertisement-related electronic coupon;
determine whether additional information from outside the mobile device is to be requested based on the determination of whether the captured information is sufficient to process the advertisement-related electronic coupon;
in response to a determination that the captured information is insufficient to process the advertisement-related electronic coupon, request additional information associated with the advertisement from an advertiser server via the at least one of the television or the set top box associated with the television, receive the additional information from the advertiser server, and obtain the electronic coupon related to the advertisement based at least on the additional information received, wherein the additional information is received by the mobile device via the at least one of the television or the set top box associated with the television in a sonic signal; and
in response to a determination that the captured information is sufficient to process the advertisement-related electronic coupon, obtain an electronic coupon related to the advertisement based only on the captured information and information from within the mobile device so that the electronic coupon is stored on the mobile device.

12. The mobile device of claim 11, further comprising:
a user interface for enabling a user to initiate capture of the advertisement related information.

13. The mobile device of claim 11, further comprising:
wherein the information is audio data broadcasted via a sonic signal; and
an audio module that captures the audio data broadcasted via the sonic signal.

14. A non-transitory machine-readable storage medium having stored thereon one or more instructions operational on a mobile client device for obtaining an electronic coupon from an advertisement, which when executed by a processor causes the mobile client device to:
capture information related to an advertisement broadcasted by at least one of a television or a set top box associated with the television;
determine whether the captured information is sufficient to process an advertisement-related electronic coupon;
determine whether additional information from outside the mobile device is to be requested based on the determination of whether the captured information is sufficient to process the advertisement-related electronic coupon;
in response to a determination that the captured information is insufficient to process the advertisement-related electronic coupon, request additional information associated with the advertisement from an advertiser server via the at least one of the television or the set top box associated with the television, receive the additional information from the advertiser server, and obtain the electronic coupon related to the advertisement based at least on the additional information received, wherein the additional information is received by the mobile client device via the at least one of the television or the set top box associated with the television in a sonic signal; and
in response to a determination that the captured information is sufficient to process the advertisement-related electronic coupon, obtain an electronic coupon related to the advertisement based only on the captured information and information from within the mobile client device so that the electronic coupon is stored on the mobile client device.

* * * * *